(12) United States Patent
Anderson et al.

(10) Patent No.: US 7,063,329 B2
(45) Date of Patent: Jun. 20, 2006

(54) SEAL/METHOD FOR IMPROVED RETENTION OF THE SEALING ELEMENT IN ANNULAR GROOVES

(75) Inventors: Herbert G. Anderson, Hilliard, OH (US); Tillman S. King, Goshen, IN (US); Hiralal V. Patel, Dublin, OH (US); Jeffry J. Beier, Eaton, OH (US)

(73) Assignee: Parker-Hannifin, Cleveland, OH (US)

( * ) Notice: Subject to any disclaimer, the term of this patent is extended or adjusted under 35 U.S.C. 154(b) by 0 days.

(21) Appl. No.: 10/871,300

(22) Filed: Jun. 18, 2004

(65) Prior Publication Data

US 2005/0280215 A1 Dec. 22, 2005

(51) Int. Cl.
*F16J 15/02* (2006.01)

(52) U.S. Cl. .................. 277/626; 277/641; 277/644
(58) Field of Classification Search ............... 277/529, 277/626, 644, 641
See application file for complete search history.

(56) References Cited

U.S. PATENT DOCUMENTS

| | | | | |
|---|---|---|---|---|
| 2,876,024 A | * | 3/1959 | Lorscheidt | .................. 277/591 |
| 3,575,431 A | * | 4/1971 | Bryant | ........................ 277/641 |
| 3,910,555 A | * | 10/1975 | Bertrem et al. | ............. 251/306 |
| 4,113,268 A | * | 9/1978 | Simmons et al. | ........... 277/641 |
| 4,744,572 A | * | 5/1988 | Sahba et al. | ................. 277/641 |
| 4,828,274 A | * | 5/1989 | Stannard | ..................... 277/641 |
| 4,874,009 A | * | 10/1989 | Pickerrell et al. | ......... 137/454.6 |
| 5,112,039 A | | 5/1992 | Walker | |
| 5,482,297 A | | 1/1996 | Burns et al. | |
| 5,511,518 A | * | 4/1996 | Jain et al. | ................. 123/90.37 |
| 5,692,758 A | | 12/1997 | Wikstrom | |
| 5,797,603 A | | 8/1998 | Voirol et al. | |
| 5,873,576 A | * | 2/1999 | Dietle et al. | ................. 277/559 |
| 6,315,302 B1 | * | 11/2001 | Conroy et al. | ............... 277/559 |
| 6,328,316 B1 | * | 12/2001 | Fukuhara et al. | ........... 277/644 |
| 6,676,131 B1 | * | 1/2004 | Hedin | ......................... 277/370 |

* cited by examiner

*Primary Examiner*—Alison K. Pickard
(74) *Attorney, Agent, or Firm*—Daniel J Whitman; Joseph J. Pophal

(57) ABSTRACT

A fitting having an axial end with a front face having an annular groove of half dovetail configuration for receiving a seal. The annular groove having a generally flat base portion, a first and a second side wall generally perpendicular with the base portion and a mouth portion generally opposite the flat base portion. The first side wall having a proximal first portion contiguous and perpendicular with the base portion, an inwardly angled flat portion contiguous with the proximal first portion, and an arcuate portion having a first end contiguous with the inwardly angled flat portion and a second end that ends into the mouth portion. The seal having a trapezoidal cross sectional area with a first flat wall, a second wall contiguous with the first wall, a third wall contiguous with the second wall, parallel with the first wall and having a shorter length than the first wall, and a fourth wall contiguous with the third and first wall. Wherein, while the seal is installed within the annular groove and not under compression, the seal second wall abuts the groove flat base portion, a portion of the seal third wall abuts the groove first side wall, and a portion of the fourth wall abuts the first flat surface of the inwardly angled lip portion.

20 Claims, 3 Drawing Sheets

SEAL/METHOD FOR IMPROVED RETENTION OF THE SEALING ELEMENT IN ANNULAR GROOVES

FIELD OF THE INVENTION

The present invention pertains to a fitting for sealed connection with another fitting in order to conduct fluid within a hydraulic system. More particularly, the present invention relates to the housing of a seal within the front face of the fitting prior to its connection with another fitting.

BACKGROUND OF THE INVENTION

Fittings for the connection of fluid conducting componentry are well known in the art. Providing a seal between adjacent surfaces of the fitting and its mating part is also well known. The seal is necessary since the fitting and its mating part are conducting a pressurized fluid which can leak at this connection without a proper seal. Such a seal is usually made of natural or synthetic rubber, which is relatively resilient and deformable. The seal is generally annular and has a circular cross-section. The fitting has an annular groove in its front face for receiving the seal.

When the fitting is properly connected to its mating part, the seal is trapped within the fitting annular groove by the adjacent face surface of the mating part. In many prior art designs the fitting groove has a generally rectangular cross-section. It is preferable to house, and retain, an O-ring or similar seal within the fitting groove for extended periods of time prior to the connection. Such a rectangular groove is incapable of ensuring that a seal, such as an O-ring, is held temporarily prior to connection of the fitting to the mating part.

Certain prior art designs require that an adhesive be used to stick the seal to the bottom of the groove prior to connection of the fitting to the mating part. The disadvantage of using the adhesive is that it requires an extra step in the assembly process. After its initial connection, it is common for the fitting to be disconnected and then reconnected. The adhesive can lose its retention capability over time and may not be able to hold the seal within the groove during its reuse.

Other prior art designs have attempted to overcome the lack of seal retention by employing a groove with a dovetail or half dovetail cross section, which more firmly holds the seal in place. However if the opening of the groove is smaller than the cross-sectional diameter of the seal, than the seal may be damaged or twisted while being placed within the groove. If the opening of the groove is larger than the cross-sectional diameter of the circular seal, the seal still has the tendency of falling out of the groove prior to attachment of the fitting with its mating part.

Certain prior art designs require that a sealing ring be twisted while placed within the groove. The twisting projects the ring towards the bottom of the groove and away from the opening. Again, this requires an additional step in the assembly process.

Other prior art designs utilize a uniquely shaped sealing element that, when correctly positioned within the groove, conform to the shape of the receiving groove. These sealing elements are typically nonsymmetrical and lose all retention characteristics when inserted into the groove in the incorrect position. It is desired to simplify the assembly process while ensuring that the sealing element is correctly inserted and retained within the fitting groove.

SUMMARY OF THE INVENTION

An object of the present invention is to provide a first fitting for sealing attachment with a second fitting. The first fitting has an axial end with a front face having an annular groove of half dovetail configuration for receiving a seal. The annular groove having a generally flat base portion, a first and a second side wall generally perpendicular with the base portion and a mouth portion generally opposite the flat base portion. The first side wall having a proximal first portion contiguous and perpendicular with the base portion, and a distal end having an inwardly angled flat portion contiguous with the proximal first portion and an arcuate portion having a first end contiguous with the inwardly angled flat portion and a second end that ends into the mouth portion. The seal having a trapezoidal cross sectional area with a first wall, a second wall contiguous with the first wall, a third wall contiguous with the second wall, parallel with the first wall and having a shorter length than the first wall, and a fourth wall contiguous with the third and first walls. Wherein prior to attachment of the first fitting with the second fitting, while the seal is installed within the annular groove and not under compression, one of the seal second and fourth walls abuts the groove flat base portion, a portion of the seal third wall abuts the groove first side wall, and a portion of the other of the second and fourth walls abuts the first flat surface of the inwardly angled lip portion.

A further object of the noted fitting has the seal being symmetrical about an axis running through the first and third walls. Another object has each of the first, second, third and fourth walls of the seal being flat and having adjacent walls connected with a curved portion. Still another object has the entire surface of one of the seal second and fourth walls being in contact with the surface of the groove. Still another object has the seal curved portion, located between either the second and third or third and fourth walls being in contact with the surface of the groove between the groove first side wall proximal first portion and the inwardly angled flat portion. Still yet a further object of the noted fitting has the seal fourth wall, relative to said seal first wall, being angled between 30° and 60°. Further features and advantages of the present invention will become apparent to those skilled in the art upon review of the following specification in conjunction with the accompanying drawings.

DETAILED DESCRIPTION OF THE INVENTION

Figure 1:
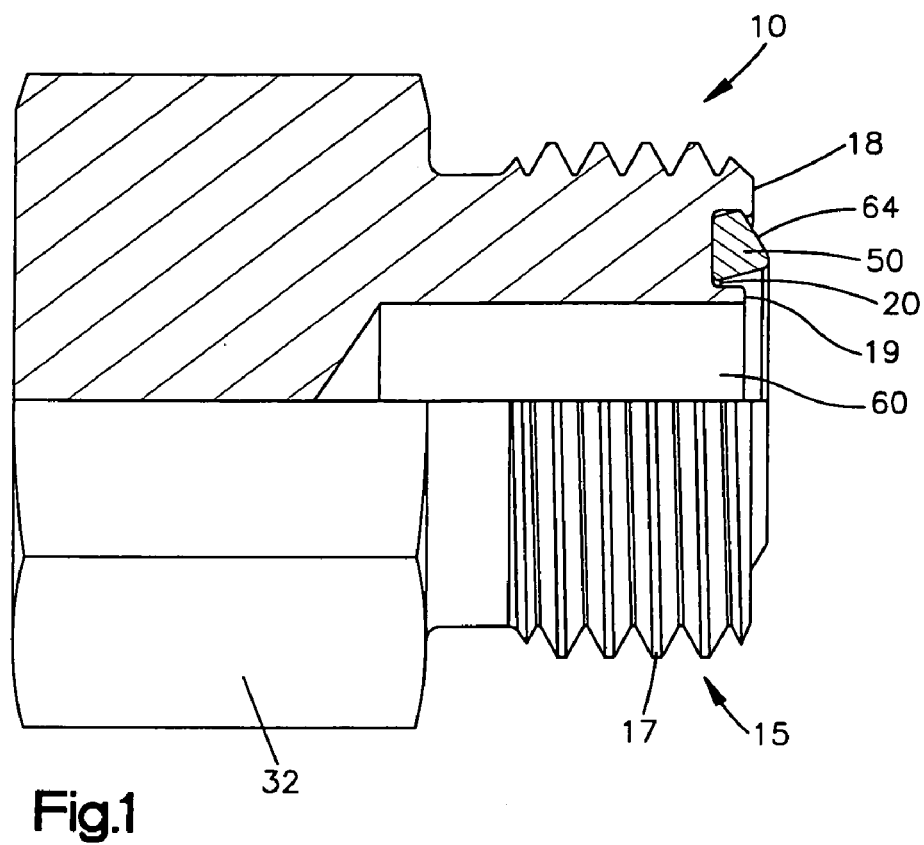
FIG. 1 is a partial sectional view of the present invention including a fitting having an annular groove that receives a seal.

Referring to FIG. 1, a fitting 10 according to the present invention is shown. Fitting 10 is typically referred to as an O-ring face seal fitting that sealingly mates with a coupling of a hose stem assembly or tubing. The hose assembly and tubing are used for conducting fluid within a hydraulic system. The mating parts have metal surfaces that are in sealing contact with each other and require an elastomeric member to provide a leak resistant seal. Fitting 10 and similar fittings are intended to be used on hydraulic systems for industrial equipment and commercial products where elastomeric seals are acceptable to overcome leakage and variations in assembly procedures. These fittings are used as fluid connectors and are capable of providing leak-proof full flow connections in hydraulic systems with varying pressure requirements.

Fitting 10 has a first end 15 with external threads 17 which mate, for example, with internal threads of a hose assembly coupling (not shown). An internal bore 60 extends through fitting 10 and provides a passage for fluid. When fully threaded together, a front outer face 18 of fitting 10 contacts the front face of the mating coupling (not shown). Fitting 10 has an inner face 19 that is slightly axially offset from outer face 18. Accordingly the front face of the mating coupling may or may not come in contact with face 19 but always contacts face 18. As is well known in the art, metal-to-metal connections require seals, e.g. elastomeric O-rings, in order to provide leak-free joints. Fitting 10 has a groove 20 which houses a seal 50 that prevents fluid from leaking between the connecting parts. Axially adjacent fitting first end 15 is a midportion 32 that is shown with a hexagonal outer surface that provides an engagement surface for a torque wrench. Although not shown and not part of the present invention, fitting 10 has a further end adjacent midportion 32, opposite of first end 15, that provides the connection means with a further fluid conductor. This end typically has external threads similar to first end 15.

Figure 2:
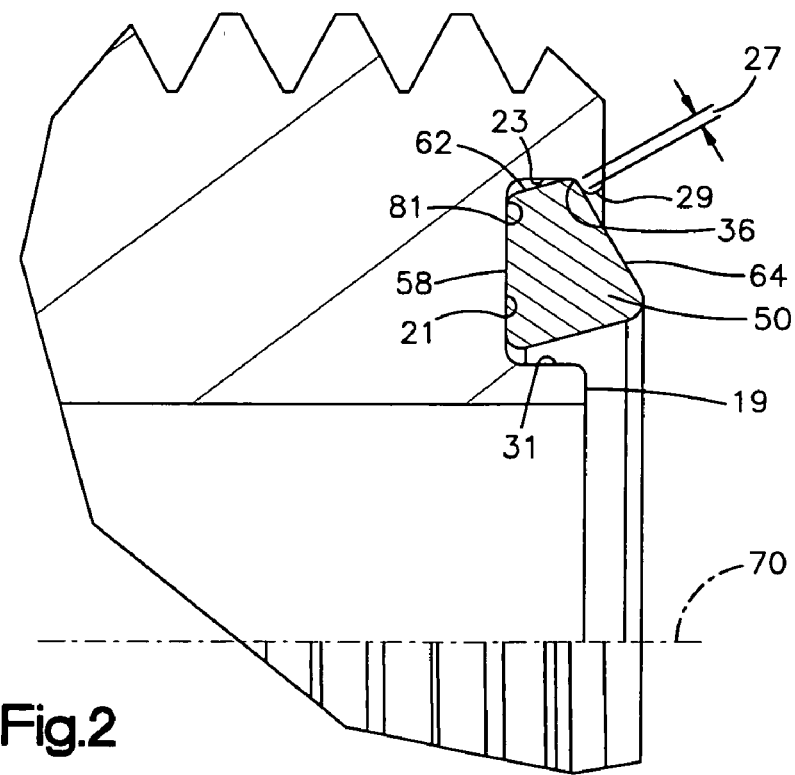
FIG. 2 is a fragmentary sectional view showing the placement of the seal within the annular groove of the fitting.
Figure 3:
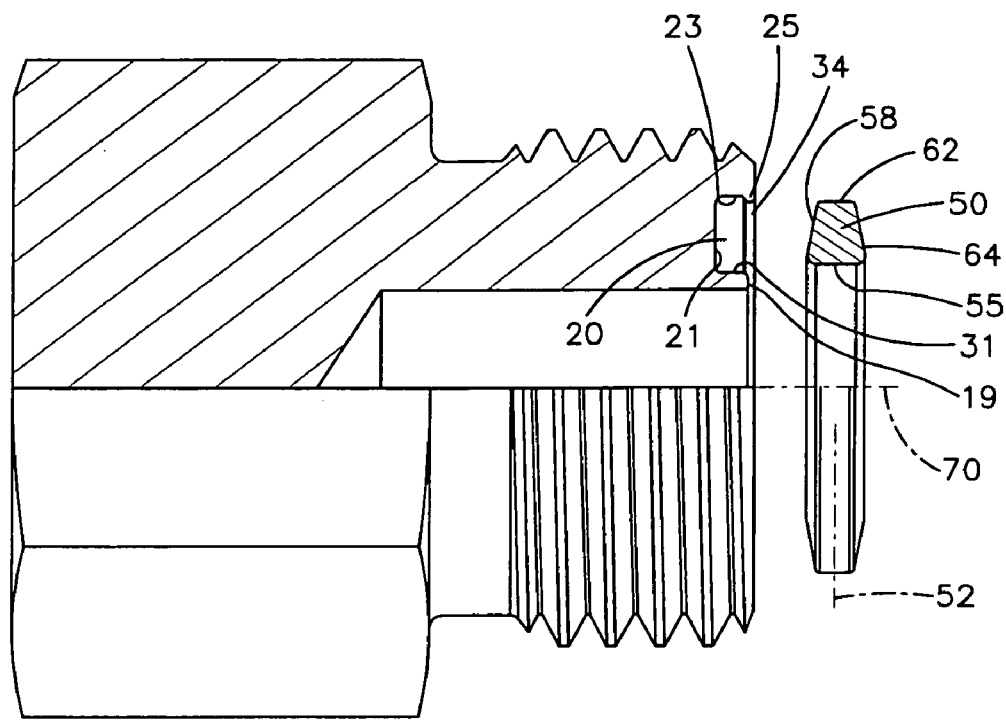
FIG. 3 is a partial sectional view, similar to FIG. 1, showing the seal outside of the fitting annular groove.

Referring to FIG. 3, as is well known in the art, groove 20 is commonly referred to as a half dove tail groove. Groove 20 has a generally flat base portion 21 that is parallel with front outer face 18 and perpendicular to the longitudinal axis (shown by element number 70) of fitting 10. Groove 20 has a first side wall 23 that is contiguous with base portion 21 and generally parallel with the longitudinal axis of fitting 10. Relative to base portion 21, the proximal end of first side wall 23 is generally flat while the distal end leads into an inwardly angled lip portion 25. Lip 25 has a flat portion 27 (best shown in FIG. 2) that, relative to first side wall 23, is angled between 120° and 150°. Flat portion 27 leads into an arcuate portion 29 that runs into front outer face 18. Groove 20 has a second side wall 31 that has a proximal end contiguous with base portion 21 and a distal end leads into front inner face 19. Second side wall 31 is generally parallel with the longitudinal axis of fitting 10. Radially between arcuate portion 29 and the distal end of second side wall 31 is a mouth portion 34.

Referring to FIG. 3, seal 50 has a generally trapezoidal cross-sectional area consistently about its circumference. Seal 50 is symmetrical about an axis 52. Seal 50 has a first flat inner wall 55 located at its radial inside surface. First flat inner wall 55 has the greatest outer extent of any of the walls. Adjacent wall 55 and contiguous therewith is a second wall 58 located on the axial side surface of seal 50. Opposite first wall 55 is a flat third wall 62 located on the top surface of seal 50. Third wall 62 is generally parallel with first wall 55, is generally perpendicular with axis 52, and is generally contiguous with said second wall. A fourth wall 64 is located between first 55 and third wall 62 and is symmetrical to second wall 58 about axis 52. Fourth wall 64 is generally contiguous with said third wall 62. A curved corner portion 36 connects said third wall 62 with said fourth wall 64 (shown in FIG. 2). Each flat wall 55, 58, 62, 64 is connected with its adjacent wall with a curved corner portion. Since first wall 55 has a greater axial extent than third wall 62, both second wall 58 and fourth wall 64 are sloped, when extending from first wall 55 in the direction of third wall 62, towards axis 52. Relative to third wall 62, second wall 58 has an angle 81 between 120° and 150°. Similarly, relative to first wall 55, fourth wall 64 has angle between 30° and 60°. If seal 50 was rotated 180° about axis 52, the shape of seal 50 would be the same.

Figure 4:
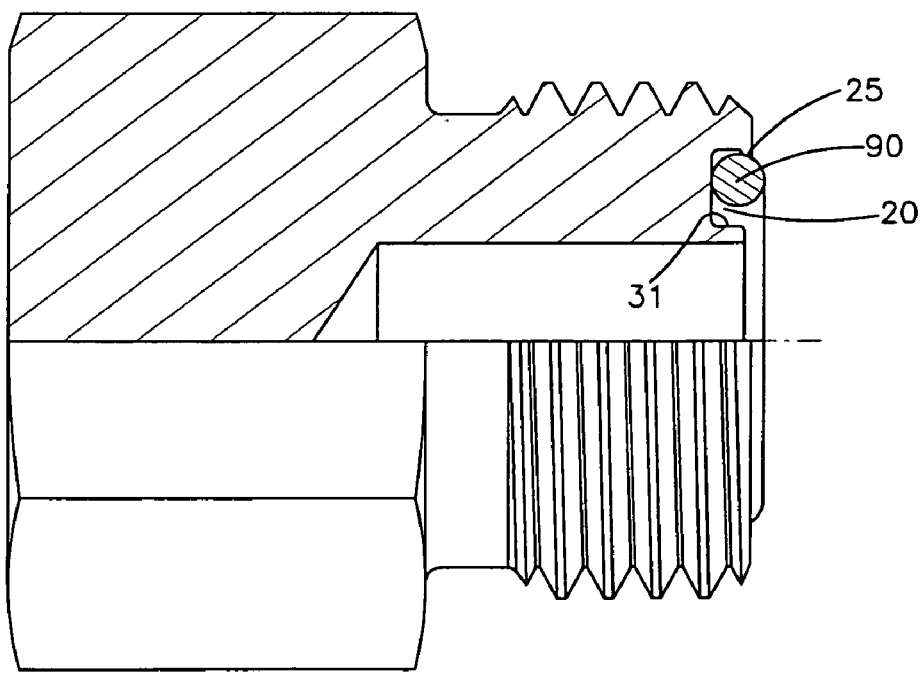
FIG. 4 is a partial sectional view of the fitting with an installed prior art O-ring.

Referring to FIG. 4, a prior art O-ring 90 is shown within groove 20. Prior to connection with the mating coupling (not shown), O-ring 90 ordinarily is housed within groove 20 during shipment and storage of fitting 10. Occasionally, O-ring 90 pops out of groove 20 during this pre-attachment period. This is due to the lack of retention between groove 20 and O-ring 90. Retention is temporarily achieved by pinching O-ring 90 at lip portion 25 or by squeezing O-ring 90 under lip portion 25. Following the insertion of O-ring 90 into groove 20, O-ring 20 will attempt to recover its original shape and move towards second wall 31. This movement will naturally cause O-ring 90 to pop out of groove 20. Further, since O-ring 90 has a circular cross-section, it sometimes will twist during installation. After awhile, O-ring 90 will untwist, pulling itself out of groove 20 during the untwisting.

In order to overcome the seal fall-out problem, greater seal retention is needed. The present invention offers greater resistance to "falling-out" since seal 50 is tucked under flat portion 27 of lip 25 instead of being pinched or squeezed as prior art O-ring 90 (shown in FIG. 4). Further, there is a greater contacting surface area of seal 50 with groove 20 than in the prior art. Referring to FIGS. 1 and 2, when initially installed into groove 20 and prior to connection (e.g. by threading) of fitting 10 with another coupling, seal 50 is reliably retained within groove 20 since a portion of walls 62 and 64 is fully tucked under flat portion 27 of lip 25. The upper portion of fourth wall 64 contacts lip flat portion 27, the portion of third wall 62 closest to wall 64 contacts first side wall 23, and the entire flat surface of seal second wall 58 contacts groove base portion 21. As noted above, flat portion 27 forms an angle with groove first side wall 23 that is coincidental with the angle of seal fourth wall 64 (relative to side wall 23 when installed). This produces the positive retention needed to prevent seal 50 from popping out of groove 20. The trapezoidal cross-section of seal 50 produces a positive force, in its tucked-in condition, under lip 25, thus neutralizing the pop-out effect of any twisting that may have been imparted to seal 50 during installation. Further, due to its symmetrical design, seal 50 could be inserted so that second wall 58 is in contact with flat portion 27 and fourth wall 64 is in contact with groove base portion 21. In this orientation, the retention is the same as in the prior position. Therefore the installer can insert seal 50 within groove 20 with either seal second wall 58 or fourth wall 64 being in contact with groove base portion 21.

It should be noted that the placement of seal 50 within groove 20 is quite simple. Due to its shape, the insertion, alone, of seal 50 within groove 20 provides the retention necessary to retain seal 50 within groove 20 prior to connection of fitting 10 with the mating coupling. Prior art designs require the seal to be twisted in order for it to be retained. Since seal 50 is designed with a similar contour of groove 20, the retention surfaces are maximized and provide the friction necessary to hold seal 50 within groove 20.

It should also be noted that the volume of groove 20 (when fitting 10 is attached with the mating coupling) occupied by seal 50 is the same as with the prior art seal, such as O-ring 90. Over time, seal 50 will swell due to fluid permeation. It is important that seal 50 not exceed the space provided by groove 20. Since the cross-sectional area of seal 50 is similar to that of prior art seals, such as O-ring 90, groove 20 will not be overfilled.

Figure 5:
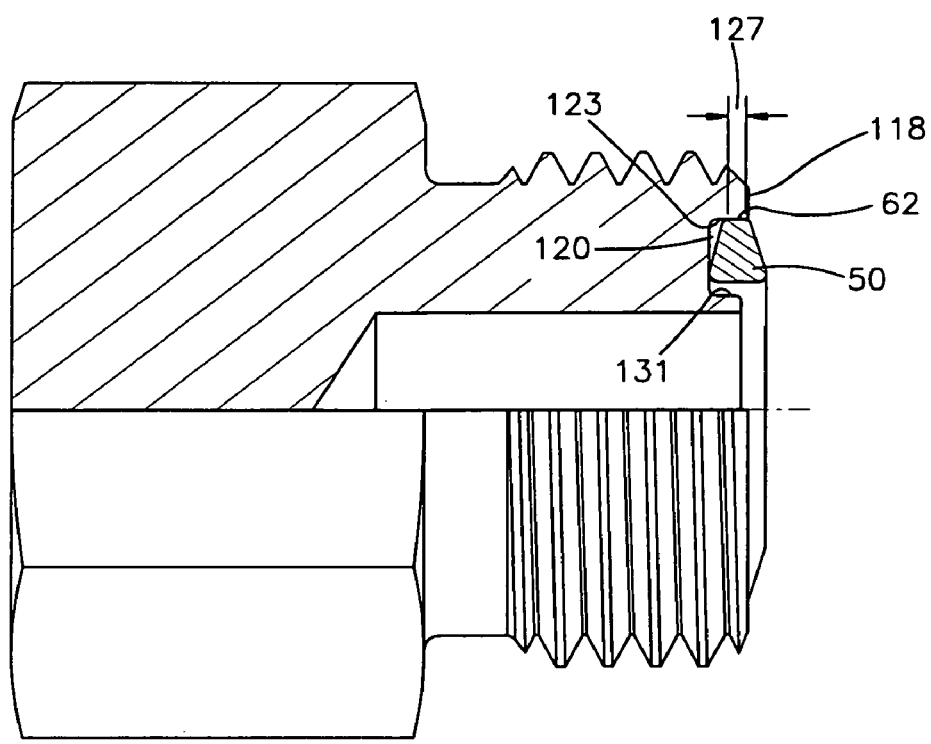
FIG. 5 is a partial sectional view of a further embodiment of the present invention showing the seal installed within a fitting annular groove having straight side portions.
Figure 6:
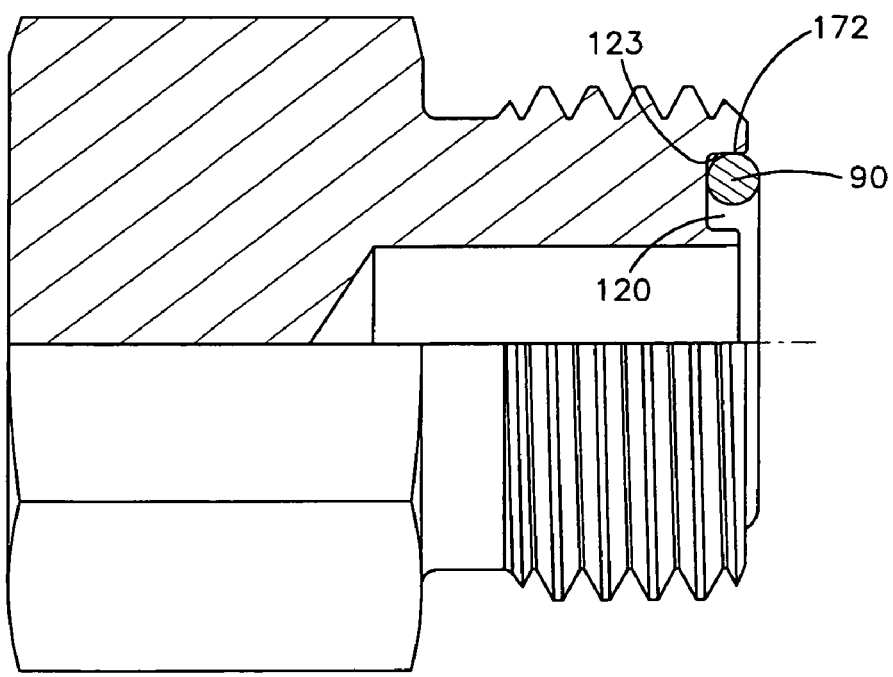
FIG. 6 is a partial sectional view similar to FIG. 5, but showing the installation of a prior art O-ring within the annular groove with straight side portions.

Referring to FIGS. 5 and 6, seal 50 also provides greater pop-out resistance in a groove 120 that does not have lip portion 25 as is exhibited with groove 20. Groove 120 is almost identical to groove 20 discussed above, except that groove 120 has a first side wall 123 that is generally flat from its proximal end to its distal end which is contiguous with a front face 118. Therefore all of first side wall 123 is parallel with a second side wall 131. When inserted into groove 120, the entire flat surface of seal third wall 62 contacts groove first side wall 123, as is indicated by element number 127. This greatly increases the retention contact area between seal 50 and groove 120 when compared with the prior art O-ring 90, detailed in FIG. 6. In the prior art design, O-ring 90 would only have a point contact, as is indicated by element number 172, of its outer surface and first side wall 123. Again, this lack of retention surface contact area makes O-ring 90 prone to popping out of groove 120.

It should be noted that the present invention is not limited to the specified preferred embodiments and principles. Those skilled in the art to which this invention pertains may formulate modifications and alterations to the present invention. These changes, which rely upon the teachings by which this disclosure has advanced, are properly considered within the scope of this invention as defined by the appended claims.

What is claimed is:

1. An assembly having a seal for installation into an annular groove of half dovetail configuration,
   said groove having a generally flat base portion, a first and a second side wall generally perpendicular with said base portion and extending into a mouth portion, said first side wall having a proximal end contiguous with said base portion and a distal end having an inwardly angled lip portion with a first flat surface that leads into an arcuate surface that ends into said mouth portion;
   said seal having a trapezoidal cross sectional area with a first wall, a second wall contiguous with said first wall, a third wall contiguous with said second wall, parallel with said first wall and having a shorter length than said first wall, and a fourth wall contiguous with said third and first wall;
   wherein when said seal is installed within said annular groove and not under compression, one of said seal second and fourth walls abuts said groove flat base portion, a portion of said seal third wall abuts said groove first side wall, and a portion of the other of said seal second and fourth walls abuts said first flat surface of said inwardly angled lip portion.

2. The assembly as in claim 1 wherein each of said seal first, second, third and fourth walls are flat and adjacent walls are connected with a curved portion.

3. The assembly as in claim 2 wherein the entire surface of one of said seal second and fourth walls is in contact with the surface of said groove.

4. The assembly as in claim 2 wherein said seal curved portion between one of said second and third walls and said third and fourth walls is in contact with the surface of said groove between said groove first side wall and said inwardly angled lip portion flat surface.

5. The assembly as in claim 2 wherein said seal is symmetric about an axis running through the middle of said seal first and third walls.

6. The assembly as in claim 1 wherein said seal is symmetric about an axis running through the middle of said seal first and third walls.

7. The assembly as in claim 1 wherein, relative to said seal third wall, said seal second wall is angled between 120° and 150°.

8. The assembly as in claim 1 wherein, relative to said seal first wall, said seal fourth wall is angled between 30° and 60°.

9. A first fitting for sealing attachment with a second fitting, said first fitting having an axial end with a front face having an annular groove of half dovetail configuration for receiving a seal,
   said annular groove having a generally flat base portion, a first and a second side wall generally perpendicular with said base portion and a mouth portion generally opposite said flat base portion, said first side wall having a proximal first portion contiguous and perpendicular with said base portion and a distal end having an inwardly angled flat portion contiguous with said proximal first portion and an arcuate portion having a first end contiguous with said inwardly angled flat portion and a second end that ends into said mouth portion;
   said seal having a trapezoidal cross sectional area with a first wall, a second wall contiguous with said first wall, a third wall contiguous with said second wall, parallel with said first wall and having a shorter length than said first wall, and a fourth wall contiguous with said third and first walls; and
   wherein prior to attachment of said first fitting with said second fitting, while said seal is installed within said annular groove and not under compression, one of said seal second and fourth walls abuts said groove flat base portion, a portion of said seal third wall abuts said groove first side wall, and a portion of the other of said second and fourth walls abuts said first flat surface of said inwardly angled lip portion.

10. The first fitting as in claim 9 wherein said seal second wall is angled, relative to said third wall, between 120° and 150°.

11. The first fitting as in claim 9 wherein said seal has a sectional area symmetrical about an axis running through said first and third walls.

12. The first fitting as in claim 9 wherein each of said first, second, third and fourth walls are flat and adjacent walls are connected with a curved portion.

13. The first fitting as in claim 12 wherein the entire surface of one of said seal second and fourth wall is in contact with the surface of said groove.

14. The first fitting as in claim 12 wherein said seal curved portion between one of said second and third and third and fourth walls is in contact with the surface of said groove between said groove first side wall proximal first portion and said inwardly angled flat portion.

15. The first fitting as in claim 9 wherein, relative to said seal first wall, said seal fourth wall is angled between 30° and 60°.

16. A first fitting for sealing attachment with a second fitting, said first fitting having a first axial end with a front face, perpendicular to the longitudinal axis of said fitting, having an annular groove for receiving a seal, said annular groove having a generally flat base portion, a first and a second side wall generally perpendicular with said base portion and a mouth portion generally opposite said flat base portion;

said seal having a trapezoidal cross sectional area with a first wall, a second wall contiguous with said first wall, a third wall contiguous with said second wall, parallel with said first wall and having a shorter length than said first wall, and a fourth wall contiguous with said third and first wall;

wherein prior to attachment of said first fitting with said second fitting, while said seal is installed within said annular groove and not under compression, the entire surface area of said seal third wall abuts said groove first side wall and a portion of said seal second wall abuts said groove flat base portion; and said seal has a sectional area symmetrical about an axis running through said first and third walls.

17. The first fitting as in claim 16 wherein each of said seal first, second, third and fourth walls are flat and adjacent walls are connected with a curved portion.

18. The first fitting as in claim 16 wherein said seal curved portion between one of said first and second walls and said first and fourth walls is in contact with the surface of said groove when said seal is installed within said groove prior to attachment with said second fitting.

19. The first fitting as in claim 16 wherein, relative to said seal third wall, said seal second wall is angled between 120° and 150°.

20. The first fitting as in claim 16 wherein, relative to said seal first wall, said seal fourth wall is angled between 30° and 60 °.

* * * * *